United States Patent

[11] 3,634,189

| [72] | Inventor | John H. Germer |
| | | San Jose, Calif. |
| [21] | Appl. No. | 708,417 |
| [22] | Filed | Feb. 26, 1968 |
| [45] | Patented | Jan. 11, 1972 |
| [73] | Assignee | General Electric Company |

[54] STEAM-COOLED REACTOR
1 Claim, 4 Drawing Figs.

[52] U.S. Cl.................................................... 176/54,
176/60, 176/55
[51] Int. Cl...................................................... G21c 15/00
[50] Field of Search............................................ 176/59, 60,
56, 54, 55

[56] References Cited
UNITED STATES PATENTS

| 3,188,277 | 6/1965 | Kornbichler et al. | 176/59 UX |
| 3,359,174 | 12/1967 | Helbling | 176/59 |
| 3,049,487 | 8/1962 | Harrer et al. | 176/54 |
| 3,121,666 | 2/1964 | Wheelock | 176/54 |
| 3,212,986 | 10/1965 | Pennington | 176/54 |

FOREIGN PATENTS

| 897,416 | 5/1962 | Great Britain | 176/60 |
| 641,030 | 5/1962 | Canada | 176/55 |

*Primary Examiner*—Reuben Epstein
*Attorneys*—Ivor J. James, Jr., Samuel E. Turner, John R. Duncan, Frank L. Neuhauser, Oscar B. Waddell and Melvin M. Goldenberg

ABSTRACT: A steam-cooled nuclear reactor system is disclosed. This system uses a steam-cooled reactor as the sole heat source and does not require the pumping of steam. Typically, saturated supply steam is directed through a reactor core where it is superheated, then through a heat exchanger to boil water to produce additional supply steam, then through the core again for resuperheating. This cycle may be repeated, with the superheated steam eventually being passed to a load, such as a turbine.

INVENTOR
JOHN H. GERMER

BY: *John R. Duncan*
ATTORNEY

STEAM-COOLED REACTOR

BACKGROUND OF THE INVENTION

In typical commercial reactors, the coolant is water, which may be heated under pressure or evaporated in the core. Recently, reactors have been developed using steam as the coolant. In reactors of this type, saturated steam enters the reactor, is superheated as it passes through the core, leaves the reactor where it is desuperheated and condensed while performing useful work, and is reevaporated and recycled back to the reactor. This system is preferred for many applications, since steam at high temperatures and pressures is often more useful than the lower temperature steam produced by conventional pressurized water and boiling water reactors. For example, electrical power generating turbines are generally more efficient and economical when driven by superheated rather than saturated steam.

A major problem, however, with steam cooled reactors results from the requirement that most of the superheated steam produced in the reactor be passed to a heat exchanger where it is used to evaporate feed water. The resulting large quantity of saturated steam must then be pumped to the reactor. In this system, generally known as the "Loeffler boiler system" large amounts of energy must be expended in pumping large quantities of saturated steam.

Attempts have been made to reduce the pumping requirements by passing steam through the reactor core a plurality of times while adding small amounts of feed water to the steam between passes in contact desuperheaters. However, these systems tend to be complex. The quantity of steam in successive reactor passes is continuously changing, leading to control problems. The desuperheaters are large and have a large amount of associated piping. Thus, a great number of piping penetrations of the reactor pressure vessel are required between the desuperheater array and the reactor. Because of their size and complexity it would be very difficult to enclose the desuperheaters in the reactor pressure vessel.

Thus, there is a continuing need for improvements in steam-cooled nuclear reactors.

SUMMARY OF THE INVENTION

It is, therefore, an object of this invention to provide a steam-cooled nuclear reactor system overcoming the above-noted problems.

Another object of this invention is to provide a simple and economical steam-cooled nuclear reactor system.

Another object of this invention is to provide an improved method of heating feed water in a steam-cooled nuclear reactor.

Still another object of this invention is to provide an improved steam-cooled nuclear reactor structure.

The above objects, and others, are accomplished in accordance with this invention, basically, by providing a nuclear reactor system in which substantially saturated steam is passed through reactor core portions at least twice, with a heat exchanger between passes which boils water for feed supply steam while desuperheating reactor coolant steam. After the final pass through a reactor core portion, the steam is passed to a load, such as a turbine, where useful work is performed. The steam is condensed and the condensate is returned to the heat exchanger(s) where it is reevaporated. Each core portion may consist of either (a) a separate, independent nuclear chain reacting assembly or core; or (b) a section of a single chain-reacting assembly or core, wherein each section has independent coolant flow, but is nuclearly coupled to the other sections. Throughout this disclosure and claims, "core portions" is intended to include concepts of both (a) and (b), above. This is a simple and economical system in which only liquid condensate, rather than steam, need be pumped. There are no compressibility losses in pumping the liquid. Also, the quantity of steam passing through the cycle remains constant, simplifying control of the reactor core. This system is simple and compact and may be contained within the reactor pressure vessel. The only penetrations of the reactor pressure vessel are a feed water inlet and a superheated steam outlet to load. As is further pointed out below, the plural core passes may be either through different portions of a single core, or through separate cores in one or more reactors.

If desired, the system may use three separate reactors or three separate sections of a single reactor core, with desuperheating heat exchangers external to the reactor(s). A portion of the steam exiting each core may be directly taken off to the turbine, if desired, so long as sufficient superheated steam remains to evaporate the required amount of feedwater.

BRIEF DESCRIPTION OF THE DRAWING

Details of the invention and various preferred embodiments and advantages thereof will become further apparent upon reference to the drawings, wherein.

DETAILED DESCRIPTION OF THE INVENTION

Figure 1:
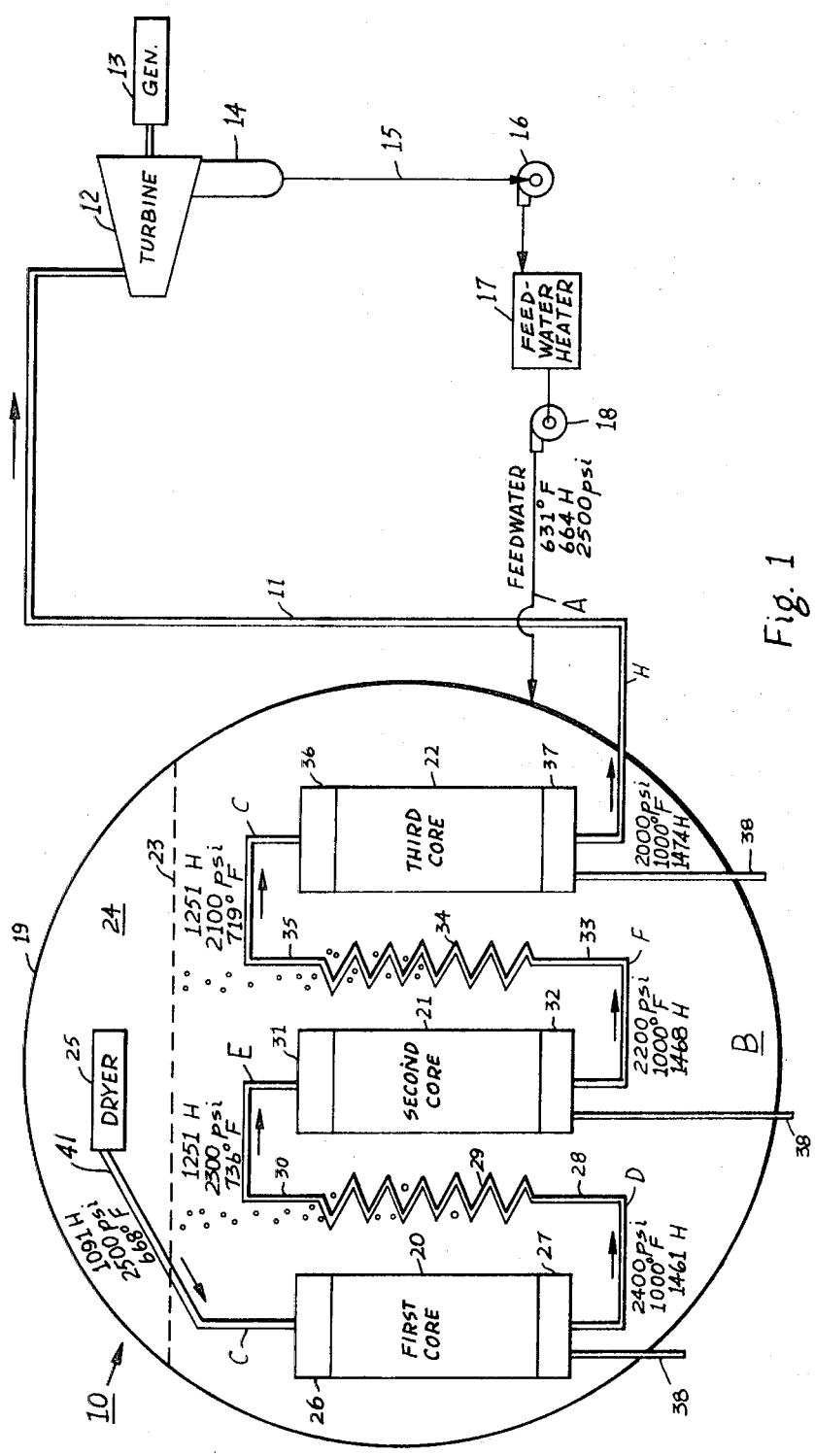
FIG. 1 shows a simple schematic flow sheet of a steam-cooled reactor power plant according to this invention.

Referring now to FIG. 1 there is seen a simple schematic representation of a nuclear power plant including a nuclear reactor generally designated 10. Superheated steam produced in reactor 10 passes through steam pipe 11 to turbine 12. Alternatively, the load utilizing the steam may be any suitable device, such as a steam heating plant for a building or for chemical process equipment. Turbine 12 with associated generator 13 are merely illustrative of typical loads. The steam converts energy to power in turbine 12 and is condensed in main condenser 14. Condensate passes through line 15 to condensate pump 16 from which it is pumped to feed water heaters 17. The preheated feed water, typically at a temperature of about 631° F., is pumped back to reactor 10 by feedwater pump 18, completing the cycle.

Reactor 10 includes an outer pressure vessel 19 containing, in this schematic showing, three individual, independent nuclear fuel assemblies or cores 20, 21 and 22. Three separate cores are shown for clarity. They could instead be three sections of a single core, or could each be located in a separate pressure vessel. Steam flow may be either upward or downward through the cores, as desired. Two or more core portions made up of independent cores or core sections may be used in the system of this invention. Again, FIG. 1 shows three cores only for clarity.

Cores 20, 21 and 22 are surrounded by water, up to a level shown approximately by dashed line 22. Above the water is a steam space 24, filled with substantially saturated steam. Saturated steam is admitted through an opening in steam dryer 25 and passes to first core 20, through pipe 41. If desired, steam dryer 25 may be omitted, although it is useful in limiting the amount of entrained water carried into core 20 with the steam.

Typically, the saturated steam entering the first core has a temperature of about 668° F. and a pressure of about 2,500 p.s.i. These figures are merely exemplary of one system, and may be varied if desired. Saturated steam from pipe 41 enters first inlet plenum 26, passes through core 20 between fuel elements, and exits to first outlet plenum 27. The steam at this point, as it enters pipe 28, has typically a pressure of about 2,400 p.s.i. and a temperature of about 1,000° F. This superheated steam passes through pipe 28 to first heat exchanger 29, where the steam is at least partially desuperheated. The heat given up is transferred to the surrounding water, forming steam bubbles which rise to surface 23 where they enter the saturated steam space 24. As the now desuperheated steam leaves heat exchanger 29 and enters pipe 30, it has a pressure of about 2,300 p.s.i. and a temperature of about 736° F. This steam now enters second inlet plenum 31 from which it passes through second core 21 to second outlet plenum 32. The steam is again superheated to the desired temperature, entering pipe 33 at a pressure of about 2,200 p.s.i. and a temperature of about 1,000° F. This superheated steam next passes through second heat exchanger 34 where it is again at least partially desuperheated, forming steam bubbles on the exterior of the heat exchanger which rise to saturated steam space 24. As the desuperheated steam enters pipe 35, it has a pressure of about 2,100 p.s.i. and a temperature of about 719° F. This steam finally passes into third inlet plenum 36 from which it passes through third core 22 to third outlet plenum 37. The steam is again superheated, having a pressure of about 2,000 p.s.i. and a temperature of about 1,000° F. as it enters pipe 11.

The heat output of the reactor cores is controlled by control rods which enter the bottom of each core. Only one such control rod for each core is shown at 38, for clarity.

It can be seen that this is an extremely simple and economical system. No steam pumps are required. All of the reactor cores and desuperheaters are contained in a single pressure vessel, with only the feed water inlet line, steam outlet pipe 11 and control rods 38 penetrating the pressure vessel. The system may be made even more compact by combining the three cores 20, 21 and 22 as three sections of a single core.

The pressures and temperatures shown at various points in FIG. 1 have been chosen to illustrate an arbitrary embodiment. For example, pressure drop through each heat exchanger and each core has been estimated at 100 p.s.i. For any given application, one skilled in the art may select reactor core and heat exchanger characteristics, and the number of heat exchangers and cores or core sections to give the desired specific characteristics.

Figure 2:
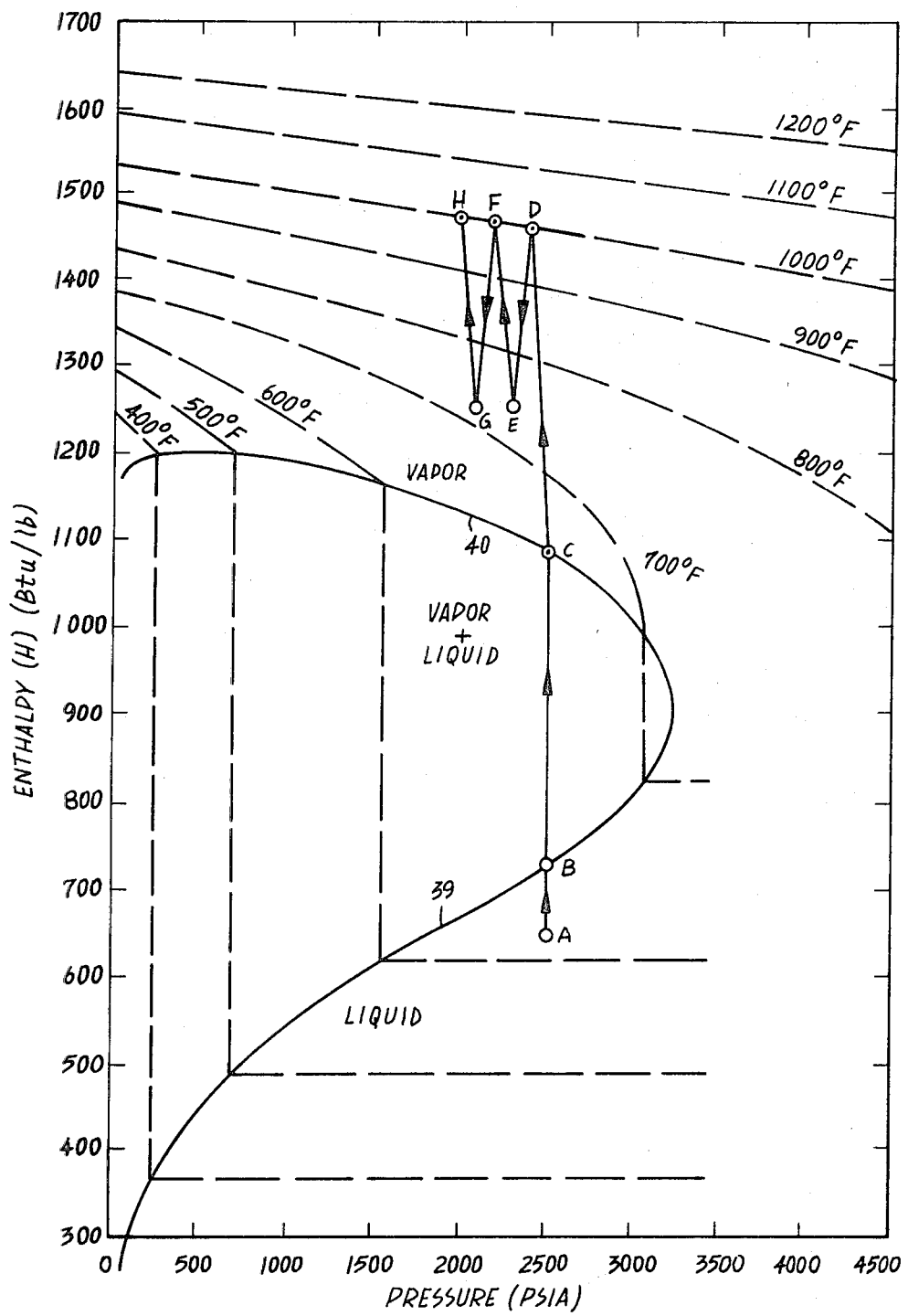
FIG. 2 shows an enthalpy-pressure diagram for the cycle of this invention.

FIG. 2 shows an enthalpy-pressure diagram for the system shown in FIG. 1, to further point out the simplicity of the system.

As seen in FIG. 2, the horizontal axis represents pressure with the vertical axis representing enthalpy. Isotherms are shown in dashed lines for each 100° from 400° to 1,200° F. Line 39 defines the approximate boundary between the liquid phase and a mixed vapor-liquid phase. Line 40 defines the approximate boundary between the vapor-liquid phase and the vapor phase.

At point A, the feed water coming into the pressure vessel is in the liquid state, at a pressure of about 2,500 p.s.i., temperature of about 631° F. and enthalpy of about 664 B.t.u./lb.

As the incoming feed water mixes with the water in the reactor and is heated, temperature and enthalpy rise to point B, where some of the water begins to vaporize.

As heat exchangers 29 and 34 continue to heat the water, boiling takes place and, temperature and enthalpy continue to rise to point C as the water vaporizes. The resulting saturated steam at point C has a pressure still at about 2,500 p.s.i., with temperature up only to about 668° F., but enthalpy has increased to about 1,191 B.t.u./lb. This steam is superheated in first core 20, greatly increasing temperature and enthalpy to about 1,000° F. and 1,461 B.t.u./lb. at point D. The pressure drops about 100 p.s.i. through the core, to about 2,400 p.s.i.

A major portion of the superheat is given up to the surrounding water in heat exchanger 29, with temperature and enthalpy dropping to about 736° F. and 1,251 B.t.u./lb. at point E. There is a pressure loss of about 100 p.s.i. through the heat exchanger, to about 2,300 p.s.i.

The steam is again superheated in second core 21, with temperature and enthalpy increasing to about 1,000° F. and about 1,468 B.t.u./lb. at point F. Again, there is a pressure loss through the core of about 100 p.s.i.

The superheated steam is again partially desuperheated in heat exchanger 34, with temperature and enthalpy dropping to about 719° F. and about 1,151 B.t.u./lb. at point G. As before, pressure loss is about 100 p.s.i.

Finally, the steam passes through third core 22, where it is again superheated to about 1,000° F. Enthalpy increases to about 1,474 B.t.u./lb. while pressure decreases to about 2,000 p.s.i. at point H. Steam having these characteristics is highly desirable for use in turbine 12.

These figures are merely illustrative since other values could be applied, or two, four or more core superheat-exchanger desuperheat cycles could be used instead of three, so long as the heat added to the feed water to evaporate it (heat added to get from point A to point C in FIG. 2, 427 B.t.u./lb.) is equal to the heat available in desuperheating (heat obtained between points D and E, 210 B.t.u./lb. plus that obtained between points F and G, 217 B.t.u./lb, in FIG. 2).

If the pressure and superheat temperature are sufficiently high, this cycle can be accomplished with only two passes through reactor core portions instead of three. Also, the number of passes may be reduced if a lower degree of superheat temperature in the steam passing to the turbine is acceptable. On the other hand, four or more cycles through reactor core portions may be preferred where pressure and superheat temperature are lower, or where it is preferred to have the steam exiting to the turbine at a still higher temperature.

In the conventional Loeffler cycle, the steam passing through the reactor is several times that flowing to the turbine. In the cycle of this invention, the same amount of steam passes through each core portion as passes to the turbine. Therefore, the total flow area in the reactor core portions can be essentially the same as in a single pass reactor used in the Loeffler cycle.

Figure 3:
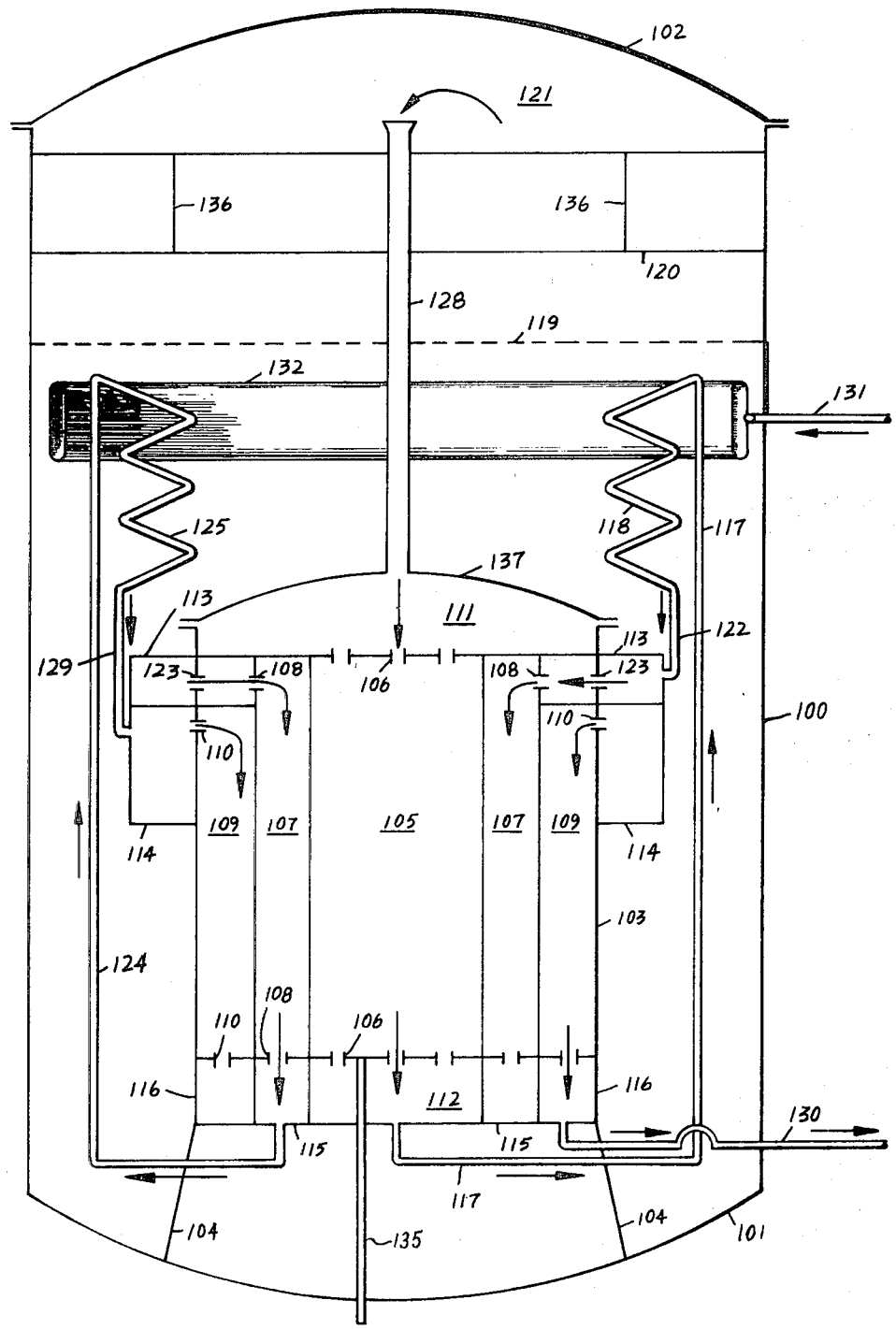
FIG. 3 shows in simple schematic form a vertical section through a reactor embodying the concept of this invention.

FIG. 3 shows a schematic representation of another embodiment of the invention in which a single core is divided into three sections to permit steam to be superheated during each of three core passes, with desuperheating to evaporate feed water between passes.

As seen in FIG. 3, the reactor is housed in a generally cylindrical pressure vessel 100, closed at the bottom by a generally dish-shaped head 101 and at the top by a removable generally dome-shaped head 102.

The multisection reactor core 103 is cylindrical to configuration and located coaxially within pressure vessel 100, supported by flaring skirt 104.

Core 103 is made up of three core sections: First core section 105 is generally cylindrical and centrally located. Passages through core section 105 generally indicated at 106 permit steam to pass through adjacent fuel elements (not shown). Second core section 107 has an annular shape surrounding core section 105. Passages generally indicated at 108 permit steam to flow through core section 105. Third core section 109 also has an annular shape and surrounds second core section 107. Passages 110 permit steam to pass through core section 109. As discussed above, additional annular core sections may be used, if desired. Three core sections are shown in FIG. 3 merely to illustrate the invention.

First inlet plenum 111 is located in position to direct steam through first core section 105. First outlet plenum 112 is positioned to receive steam from first core section 105. Similarly, second and third inlet plenums 113 and 114 and second and third outlet plenums 115 and 116 are located to direct steam to and receive steam from second and third core sections 107 and 109, respectively.

Saturated steam enters first inlet plenum 111, passes into first core section 105 where it is superheated and exits into first outlet plenum 112. The now superheated steam then passes through pipe 117 to first heat exchanger 118 where it heats the water which fills pressure vessel 100 to about the level indicated by dashed line 119. As steam is desuperheated in heat exchanger 118, water vapor bubbles form and rise to the water surface. The resulting steam passes through steam dryer 120 to saturated steam space 121 from which it passes through return pipe 128 to first inlet plenum 111.

Meanwhile, desuperheated steam leaving first heat exchanger 118 passes through pipe 122 to second inlet plenum 113, which is in the form of a ring around core 103. Steam passes to second core section 107 through a plurality of openings 123 which are isolated from adjacent third core section 109. The desuperheated steam passes through second core section 107 where it is again superheated. The resuperheated steam leaves second exit plenum 115 through pipe 124 to second heat exchanger 125. Again, the steam is desuperheated while evaporating additional water which rises as steam to saturated steam space 121.

The again desuperheated steam passes through pipe 129 to third inlet plenum 114. The steam enters third core section 109 where it is again superheated. The superheated steam exits to third outlet plenum 116, then leaves the reactor through line 130 to a load, such as a turbine, where it performs useful work and is condensed. Condensate is treated and returned to the reactor as feed water through feed water line 131. The feed water enters annular feed water sparger 132 which distributes the feed water into the water-filled space. The water is again evaporated, and the above-described cycle is repeated.

This is a very compact and simple system. Reactivity of the several core sections may easily be controlled by control rods entering the bottom of core 103 through lower head 101. Only one of these control rods is shown at 135, for clarity. The reactor may easily be refueled or repaired by removing upper head 102. A disk-shaped center section of steam dryers 120, as indicated at 136, may be removed with return pipe 128 and a removable cover 137 over first inlet plenum 111. Fuel in core 103 is then readily accessible.

This system is especially effective since no large, relatively inefficient, electric-motor or turbine-driven steam pumps are required.

Figure 4:
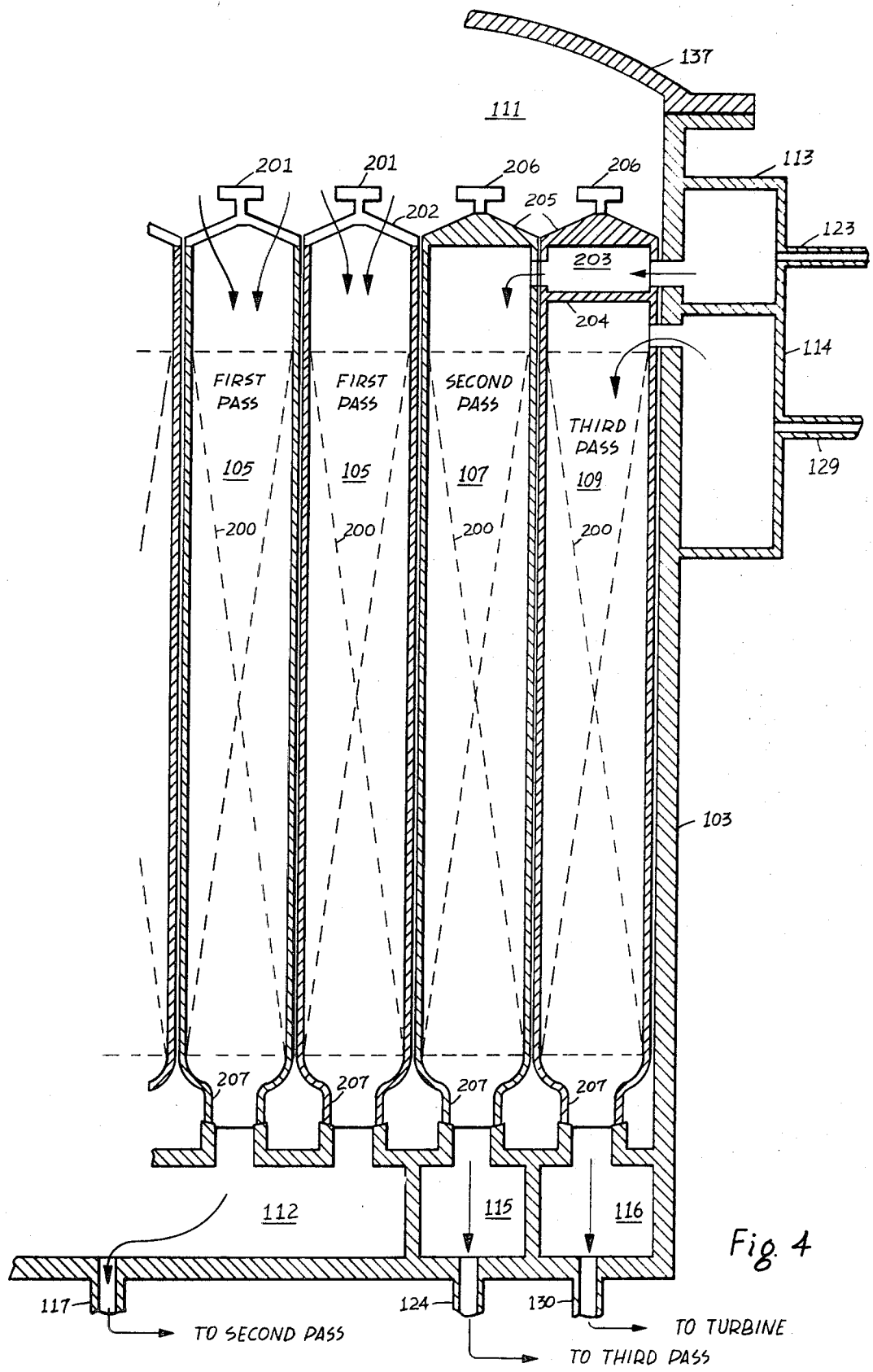
FIG. 4 shows a vertical section through a portion of a core of the sort useful in the reactor shown in FIG. 3.

FIG. 4 shows a section through a portion of a core such as that shown at 103 in FIG. 3, showing a typical fuel bundle arrangement. The arrangement shown in FIG. 4 is generally applicable to the overall plant shown in FIG. 3, although the arrangement of steam pipes has been modified slightly in FIG. 4, for clarity.

First core section 105 is made up of a plurality of fuel bundles, two of which are shown in FIG. 4. These bundles typically have a square or hexagonal cross section and support a plurality of spaced, parallel, fissile fuel containing rods. The location of the fuel rod array is schematically indicated by broken line 200. Any suitable arrangement of fuel elements may be used. Typical arrangements include those described in U.S. Pat. No. 3,350,275. Fuel bundles in first core section 105 are open at the top and bottom, permitting steam to pass therethrough. Lifting handles 201 are provided at the tops of these bundles, secured to the bundle walls by bars 202.

As described above, saturated steam passes from first inlet plenum 111 through first core section 105 where it is superheated to first outlet plenum 112. The steam then is desuperheated and returned to second inlet plenum 113 through pipe 123.

Bundles making up third core section 109 have an opening 203 transversely across the tops of the bundles which connects with openings in second inlet plenum 113 and in the tops of the bundles making up second core section 107. The body of the bundles making up third core section 109 are isolated from passages 203 by plates 204.

Thus, saturated steam passes from second inlet plenum 113 through passages 203 to second core section 107 where it is again superheated. The superheated steam exits through second exit plenum 115 and pipe 124 to be again desuperheated while evaporating water.

The again desuperheated steam returns through pipe 129 to third inlet plenum 114. This substantially saturated steam passes through third core section 109 where it is again superheated to third exit plenum 116. The steam finally leaves the reactor through pipe 130 to the turbine or other load.

The bundles making up second and third core sections 107 and 109 are closed at the top by end plates 205 and are provided with lifting handles 206.

At the lower ends, the bundles have tapering end portions 207 which mate with projections on the several outlet plenums. This mating action permits the bundles to be easily lowered into place by conventional remotely operated cranes. The bundles fit snugly into place, so that there is little leakage where the bundles join the inlet and outlet plenums. However, slight leakage is not detrimental to system performance, since there is water or steam on each side of each joint. Leakage of steam into water will merely aid, slightly, evaporation by the boilers, while leakage of water into steam will merely slightly decrease the superheat temperature of the steam. The steam as it leaves the boilers and returns to the core may be substantially saturated, slightly superheated or may be saturated with a slight amount of entrained water, as desired.

Clearly, many modifications can be made to the reactor structure within the scope of the above disclosure and schematic embodiments. For example, if desired the boilers may be located below the core and control rod may enter the core from the top. Also, the location and shape of the various inlet and outlet plenums may be varied, depending upon the shape and arrangement of the multisection core. The arrangements shown in the drawings are merely illustrative of the invention.

Other modifications and ramifications of the present invention will occur to those skilled in the art upon reading the present disclosure. These are intended to be included within the scope of this invention.

I claim:

1. A steam-cooled nuclear reactor comprising: a pressure vessel; a pool of water in said pressure vessel; a chamber in said vessel containing substantially saturated supply steam; a first core portion containing heat emitting nuclear fuel; means to pass steam from said chamber through said first core portion to superheat said steam; a heat exchanger in said pool; means to pass superheated steam from said first core portion through said heat exchanger to vaporize a part of the water in said pool; means to direct said vapor to said vapor to said supply steam chamber; a second core portion containing heat emitting nuclear fuel; means to pass the steam from said heat exchanger through said second core to resuperheat said steam; a second heat exchanger in said pool; means to pass said resuperheated steam through said second heat exchanger to vaporize an additional part of the water in said pool; a third core portion containing heat emitting nuclear fuel; and means to pass the steam from said second heat exchanger through said third core portion to resuperheat said steam; said first core portion being approximately cylindrical and said second and third portions being annular sections arranged concentrically around said first core portion.

* * * * *